Dec. 16, 1947.   W. J. SCHUMACKER   2,432,819
METHOD OF MAKING COMPOSITE PERMANENT MAGNETS
Filed Sept. 28, 1944   2 Sheets-Sheet 1

Inventor
Walter J Schumacker

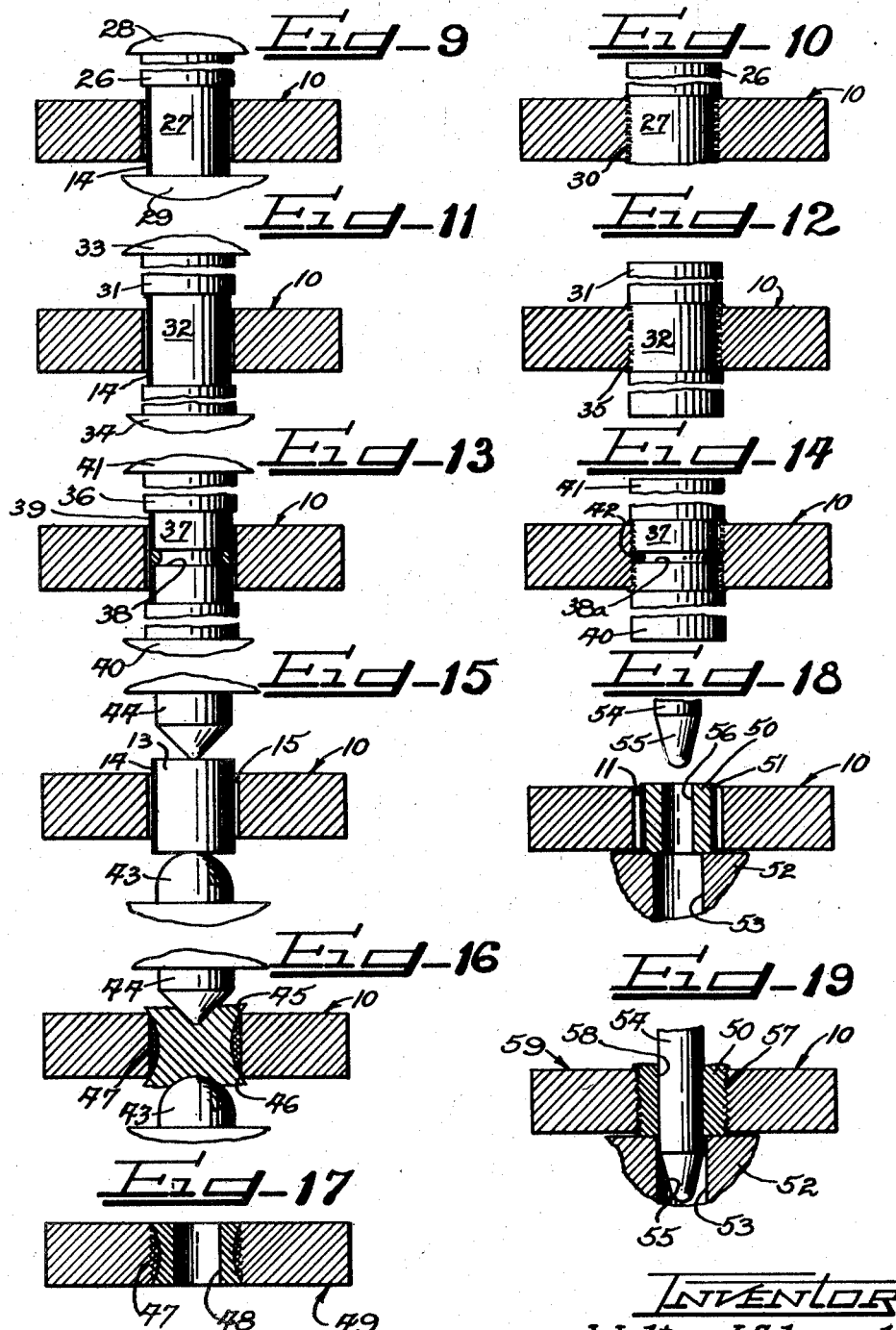

Patented Dec. 16, 1947

2,432,819

UNITED STATES PATENT OFFICE 2,432,819

METHOD OF MAKING COMPOSITE PERMANENT MAGNETS

Walter J. Schumacker, Valparaiso, Ind., assignor to The Indiana Steel Products Company, Chicago, Ill., a corporation of Indiana Application September 28, 1944, Serial No. 556,124

3 Claims. (Cl. 29—155.59)

This invention relates to a composite permanent magnet and to a method of making the same.

In the making of composite permanent magnets from "Alnico" permanent magnet alloys, difficulty is experienced in forming the permanent magnet to the desired final shape, and dimensions, owing to the practical impossibility of machining "Alnico." The customary method is to cast "Alnico" alloy to the desired shape and then to grind certain of the surfaces to the required tolerances. This is a laborious and an expensive operation because of the extreme hardness of "Alnico" alloy and also because of the small dimensions that are often required in permanent magnets.

Where the permanent magnet is to be in the form of a ring, or annulus, having a bore that must be concentric with the external cylindrical surface of the magnet, I have attempted, in order to avoid internal grinding operations on the permanent magnet alloy itself, to position a metallic insert in the bore of the permanent magnet by an upsetting operation and then drill and machine the insert to form a bore having the desired dimensions within close tolerances. Attempts to upset a metallic insert within the bore of a ring-shaped permanent magnet of the "Alnico" type have, however, resulted in failure. "Alnico" permanent magnet alloys are, in general, so brittle and lacking in cohesive strength that the alloy itself ruptures under the forces of expansion created by the upsetting operation. Even where a relatively soft iron core, or insert, is upset in the bore of a disc-shaped permanent magnet, the forces are usually sufficient to crack, or rupture, the material of the permanent magnet.

I have now found, however, that if the metallic insert, or core, is first coated with a relatively soft metal, or metallic alloy, as for instance, with solder or a brazing alloy, the softer coating serves as a cushion during the upsetting or expanding operation and thereby prevents the forces of expansion from rupturing the permanent magnet material. Preferably, but not necessarily, the coating of softer metal or alloy, is sufficiently thin that the material of the coating is squeezed out or dissipated within the pores of the permanent magnet material to give a metal-to-metal contact between the metal of the insert, or core, and that of the body of the permanent magnet. There is thus produced a firm union between the metal of the insert and that of the body of the permanent magnet. The insert may then be drilled and machined to the desired finished dimensions.

It is therefore an important object of this invention to provide a composite permanent magnet and a method of making such composite permanent magnet with an insert of a different metal firmly secured in the body of the permanent magnet.

It is a further important object of this invention to provide a method of making a composite permanent magnet, in accordance with which an insert, or core, coated with a relatively soft metal or alloy, is upset or expanded in the bore of the permanent magnet to fill the bore so as to be permanently retained therein, but without creating forces of expansion sufficiently great to damage the permanent magnet itself.

Other and further important objects of this invention will be apparent from the disclosures in the specification and the accompanying drawings.

As shown on the drawings:

Figure 9 is a transverse sectional view, with parts broken away and in elevation, of a further modified form of my invention, illustrating a method of mounting a magnet on the end of a shaft in an over-hung manner.

Figure 10 is a transverse sectional view of the modified form of magnet construction resulting from the method illustrated in Figure 9.

Figure 11 is a transverse sectional view of a magnet, with parts broken away and in elevation, illustrating a further modified form of my invention in which the magnet is mounted on a shaft intermediate its ends.

Figure 12 is a transverse sectional view, with parts broken away and in elevation, of the modified form of permanent magnet construction made by the method illustrated in Figure 11.

Figure 13 is a transverse sectional view, with parts broken away and in elevation, of a further modified form of my invention, in which the shaft on which the permanent magnet is to be mounted is provided with a reduced and grooved intermediate section.

Figure 14 is a transverse sectional view of the modified form of permanent magnet construction resulting from the method illustrated in Figure 13.

Figure 15 is a transverse sectional view, with parts in elevation, of a further modified form of my invention, in accordance with which the expansion of the metal insert is effected by the use of a prick-punch.

Figure 16 is a transverse sectional view of the permanent magnet construction illustrated in Figure 15, at a later stage in its preparation.

Figure 17 is a transverse sectional view of the final modified form of permanent magnet construction resulting from the method illustrated in Figures 15 and 16.

Figure 18 is a transverse sectional view, with parts in elevation, of a further modified form of permanent magnet construction, in accordance with which a hollow metallic insert is employed and the insert expanded by means of a mandrel, or plunger.

Figure 19 is a transverse sectional view, with parts in elevation, of the modified form of permanent magnet construction resulting from the method illustrated in Figure 18.

As shown on the drawings:

Figure 1:
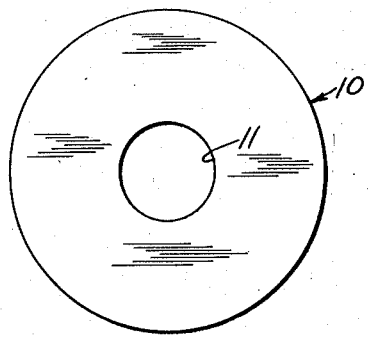
Figure 1 is a top plan view of a permanent magnet alloy in the form of a ring, or annulus.
Figure 2:
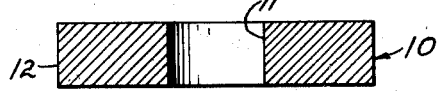
Figure 2 is a transverse sectional view of the same.

As shown in Figures 1 and 2, the method of my invention starts with a permanent magnet, or a permanent magnet alloy, in the form of a ring, or annulus, which is indicated generally by the reference numeral 10. Such a ring is ordinarily made by casting a molten permanent magnet alloy in a baked sand mold. The casting 10 so produced is in the from of a cylindrical disc having a bore 11 extending therethrough which is intended to be concentric with the outer cylindrical wall 12 of the disc. Owing to the limitations of a sand casting operation, however, it is impossible to provide a bore 11 that is exactly concentric with the outer cylindrical wall 12, or a bore that is so smooth and accurately dimensioned as not to require further grinding to bring it within the permitted tolerances.

In accordance with the principles of my invention, a metallic insert 13 is provided that is of slightly greater length than the length of the bore 11 and of slightly less outside diameter than the inside diameter of said bore 11. The insert 13, which may be formed of soft iron, steel, or other metal that is easily machinable, is next provided with a coating 14 of a relatively soft metal or alloy. The coating may be applied in different ways, as by dipping, electroplating spraying or the like. The material of the coating 14 is preferably a relatively soft metal, or alloy, such as a solder metal or alloy, or a brazing metal or alloy or copper, brass, bronze, or tin. The insert 13 may, for instance, be provided with a tin coating, as by hot dipping, electroplating or the like, or with a coating of tin-lead solder, German silver, or other brazing material, copper, brass, or bronze by dipping, electroplating, or spraying.

As an example of the dimensions found to be suitable, the coating 14 may be about 0.01 inch in thickness. If the bore 11 is ⅜ of an inch in diameter, the coated insert 13 should be about 11/32 of an inch in diameter; and if the bore 11 is ¼ of an inch in length, the insert 13 should be about ⅜ of an inch in length. These dimensions are, however, only typical and are not intended to place any limitations on the scope of the invention herein described and claimed.

Figure 4:
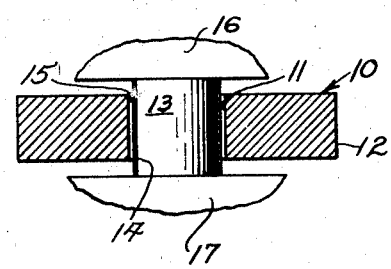
Figure 4 is a transverse sectional view, with parts in elevation, of the permanent magnet ring with the insert in place and about to be upset.

The coated insert 13 is positioned within the bore 11 of the ring 10. As illustrated in Figure 4, there is a slight clearance, as at 15, between the surface of the bore 11 and the outer surface of the coating 14, but the amount of the clearance is exaggerated for the sake of clearness. Actually, there may be a sufficiently snug fit between the coated insert 13 and the bore 11 that the casting 10 will be lightly retained in position intermediate the ends of the insert. The assembly is then put between the jaws 16 and 17 of an upsetting machine and an upsetting pressure exerted by said jaws.

Figure 5:
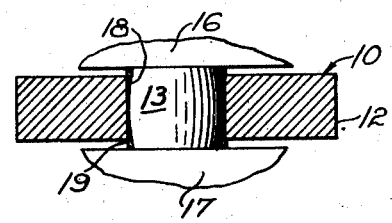
Figure 5 is a transverse sectional view, partly in elevation, similar to Figure 4, illustrating a stage in the upsetting operation.
Figure 6:
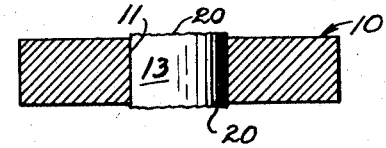
Figure 6 is a transverse sectional view of the composite permanent magnet at the end of the upsetting operation, with the insert, or core, in elevation.
Figure 7:
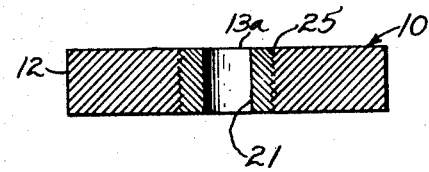
Figure 7 is a transverse sectional view of the finished composite permanent magnet after the insert, or core, has been drilled and machined.

As illustrated in Figure 5, in the initial stages of the upsetting operation, the insert 13 is caused to expand radially at its middle portion to assume a barrel-like shape, as indicated at 18. The coating 14 is thus squeezed out between the middle portion of the insert 13 toward the faces of the casting 10, as at 19. The upsetting operation is continued until, as illustrated in Figure 6, the insert 13 substantially fills the bore 11 throughout its entire length, the major portion of the coating material being forced out at the surface of the joint between the insert and the bore, as at 20. Some of the material of the coating 14 is also forced into the pores of the casting 10. Thus, while a residue of the coating material 14 remains at the joint between the insert and the bore 11, as indicated at 25 (Fig. 7), there is actually produced a metal-to-metal bond between the insert and the casting.

The insert 13 is next drilled to provide a bore 21 which is concentric with the external cylindrical surface 12 of the casting 10. Said bore 21 may be machined to provide a smooth surface and an inside diameter of the desired final dimensions. In this way, close tolerances can be maintained, whereas without the provision of the insert 13 it would be impossible to get within the tolerances required.

There is thus produced a composite permanent magnet, comprising a casting 10 of the permanent magnet alloy and an inner sleeve 13a having an accurately dimensioned bore 21 therethrough. Owing to the cushioning effect of the relatively soft coating 14 the insert 13 can be upset to fill the initial bore 11 in the casting 10 without producing sufficient strain upon the casting to crack or rupture the same. The coating 14, however, is sufficiently thin to be substantially dissipated in the upsetting operation and thus permit a firm, mechanical union between the insert 13, or the sleeve 13a, and the casting 10.

Figure 8:
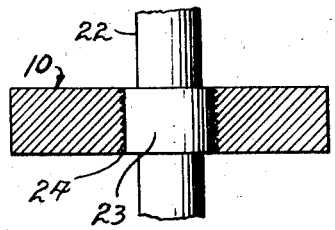
Figure 8 is a transverse sectional view, with parts in elevation, of a modified construction of a composite permanent magnet in which the insert is a shaft.

In Figure 8 there is shown a modified form of construction in which in place of an insert such as the insert 13, a shaft 22 is positioned in a permanent magnet alloy casting 10. In this connection, the shaft 22 may be provided with a stepped portion 23 of slightly larger diameter than the shaft itself. Initially, the stepped portion 23 is also slightly longer than and of slightly less diameter than the bore in the casting 10, and is coated with a relatively soft layer, much the same as was described in connection with the insert 13. The stepped portion 23 is then upset between annular upsetting dies (not shown) to expand and provide a firm bond between the stepped portion 23 and the casting 10. As previously described, this bond is substantially a metal-to-metal union between the metal of the stepped portion 23 and that of the casting 10, with only a slight residue of the coating material remaining in the joint so formed, as indicated at 24.

As illustrated in Figures 9 and 10, the permanent magnet casting 10 is affixed to the end of a shaft 26 by first forming said shaft with a reduced end 27, coating said reduced end with a layer 14 of soft metal or metal alloy, and then upsetting the reduced end 27 between upsetting dies 28 and 29. In this way the softer metal or alloy of the layer 14 is substantially eliminated from the joint between the reduced end 27 and the permanent magnet casting 10 to provide a metal-to-metal bond as at 30.

In Figures 11 and 12 a further modification of my invention is illustrated, in accordance with which the permanent magnet casting 10 is affixed to a shaft 31 at a reduced portion 32 thereof, intermediate the ends of the shaft. The intermediate reduced portion 32 is provided with a layer 14 of the softer metal or alloy and then this reduced portion is upset between a pair of upsetting dies 33 and 34. As a result of the upsetting operation, the intermediate portion 32 is expanded into engaging contact with the permanent magnet casting 10 to provide a metal-to-metal joint therebetween as at 35.

In the further modification of my invention illustrated in Figures 13 and 14, a shaft 36 is provided with a reduced portion 37 intermediate its ends and said reduced portion is further provided with a groove 38. A layer 39 of the softer metal or alloy is applied to the reduced portion 37 so as to coat the same and also fill the groove 38. Accordingly, when the shaft 36 is placed between upsetting dies 40 and 41 and pressure applied thereto, the intermediate reduced portion 37 of the shaft is upset to bring about a physical engagement with the wall of the bore of the permanent magnet casting 10. During the upsetting operation, the groove 38, now indicated by the reference numeral 38a, may be partially or completely collapsed, but ordinarily said groove 38 will merely tend to close partially, leaving a portion 42 of the softer metal or alloy from the coating 39 filling the groove.

Figure 3:
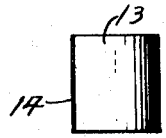
Figure 3 is an elevational view, partly in section, of an insert, or core, cylindrical in shape and provided with a coating of a softer metal or alloy upon its cylindrical wall.

In the modification of the invention illustrated in Figures 15, 16 and 17, an insert 13 having a coating 14 thereover, the same as illustrated in Figure 3, is positioned within the bore 15 of a permanent magnet casting 10. The insert 13 is supported upon an abutment 43 which preferably has a rounded surface concentric with the axis of the insert 13. A prick-punch 44 is then driven into the upper end of the insert 13, thereby causing the metal of the insert 13 to flow outwardly at both the upper and lower ends thereof, as illustrated at 45 and 46, the intermediate portion of the insert assuming a longitudinal concavity into which the material of the coating 14 is crowded, as at 47. A firm purchase between the expanded end portions 45 and 46 of said insert and the adjacent portions of the permanent magnet casting 10 is thus effected. As illustrated in Figure 17, the insert 13 may then be drilled to provide a bore 48 in the finished magnet assembly 49, a portion of the softer metal or alloy, in this case, remaining trapped within the joint, as at 47.

In Figures 18 and 19, a still further modification of my invention is illustrated, in accordance with which a permanent magnet casting 10 having an inner bore 11 is provided with an insert in the form of a hollow cylindrical sleeve 50. Said sleeve 50, together with its coating 51 of the softer metal or alloy, is initially of slightly less diameter than the inside diameter of the bore 11. After being placed in said bore so as to rest upon a lower abutment member 52 provided with a bore 53, an arbor or plunger 54 having a tapered rounded end 55 is forced into and through the bore 56 of said insert 50. As a result of this operation, the metal of the cylindrical sleeve 50 is expanded to form a firm bond, as at 57 with the metal of the casting 10, and at the same time the plunger 54 provides a bore 58 of the desired diameter within the metal of said insert 50. Upon the withdrawal of the plunger 54, there is provided a composite permanent magnet assembly 59 having a properly dimensioned bore 58 concentric with the outer cylindrical wall of the permanent magnet casting 10.

It will be understood that the principles of my invention may be utilized in connection with other materials than permanent magnet alloys of the "Alnico" type, as for instance in any composite structure where the material is relatively hard, brittle and lacks cohesive strength.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of making a composite permanent magnet, which comprises casting a permanent magnet into a shape having a cylindrical bore therethrough, said casting being relatively hard and brittle and the wall of said bore being relatively rough, positioning within said bore a coated insert of a machinable alloy of greater length but only slightly lesser diameter than said bore, said insert having a relatively soft coating, and upsetting said insert to expand the same to completely fill said bore and force said coating into interlocking permanent engagement with said bore wall.

2. The method of making a composite permanent magnet, which comprises casting a permanent magnet into a cylindrical shape having a cylindrical bore therethrough, said casting being relatively hard and brittle and the wall of said bore being relatively rough, positioning within said bore a coated solid insert of a machinable alloy of greater length but only slightly lesser diameter than said bore, said insert having a relatively soft coating, upsetting said insert to expand the same and force said coating into interlocking permanent engagement with said bore wall, and providing said insert with a smooth and accurately dimensioned bore concentric with said cylindrical casting.

3. The method of making a composite permanent magnet, which comprises casting a permanent magnet into a cylindrical shape having a cylindrical bore therethrough approximately concentric therewith, said casting being relatively hard and brittle and the wall of said bore being relatively rough, positioning within said bore an insert of a machineable alloy of greater length but only slightly lesser diameter than said bore, said insert having a surface relatively softer than the wall of said bore, upsetting said insert to expand the same and force the surface of said insert into interlocking permanent engagement with said bore wall, and providing said insert with a smooth and accurately dimensioned bore concentric with said cylindrical casting.

WALTER J. SCHUMACKER.

REFERENCES CITED

The following references are of record in the file of this patent:

UNITED STATES PATENTS

| Number | Name | Date |
|---|---|---|
| 1,397,080 | Coleman | Nov. 15, 1921 |
| 1,857,912 | Jones | May 10, 1932 |
| 2,078,805 | Merrill | Apr. 27, 1937 |
| 1,695,017 | Kuckuck | Dec. 11, 1928 |
| 1,469,793 | Johnson | Oct. 9, 1923 |
| 627,992 | Everson | July 4, 1899 |
| 2,197,793 | Everett | Apr. 23, 1940 |
| 980,420 | Hulfish | Jan. 3, 1911 |